United States Patent
Turner

(10) Patent No.: US 11,753,094 B2
(45) Date of Patent: Sep. 12, 2023

(54) TRACK DRIVEN WORK MACHINE

(71) Applicant: Turner Development Limited, Alcester (GB)

(72) Inventor: Anthony Leonard Turner, Alcester (GB)

(73) Assignee: Turner Development Limited, Alcester (GB)

( * ) Notice: Subject to any disclaimer, the term of this patent is extended or adjusted under 35 U.S.C. 154(b) by 331 days.

(21) Appl. No.: 17/255,513

(22) PCT Filed: Jun. 24, 2019

(86) PCT No.: PCT/GB2019/051779
§ 371 (c)(1),
(2) Date: Dec. 23, 2020

(87) PCT Pub. No.: WO2020/002896
PCT Pub. Date: Jan. 2, 2020

(65) Prior Publication Data
US 2021/0371022 A1    Dec. 2, 2021

(30) Foreign Application Priority Data
Jun. 26, 2018 (GB) .................................... 1810453

(51) Int. Cl.
*B62D 55/116* (2006.01)
*B62D 55/06* (2006.01)
*B62D 55/112* (2006.01)

(52) U.S. Cl.
CPC ............ *B62D 55/116* (2013.01); *B62D 55/06* (2013.01); *B62D 55/112* (2013.01)

(58) Field of Classification Search
CPC ........ B62D 55/00; B62D 55/02; B62D 55/08; B62D 55/084; B62D 55/06; B62D 55/10;
(Continued)

(56) References Cited

U.S. PATENT DOCUMENTS 3,189,116 A * 6/1965 Steffen ............... B62D 55/0842
180/41
3,430,790 A * 3/1969 Beltrami ................... E02F 9/10
180/41
(Continued)

FOREIGN PATENT DOCUMENTS

CN    106627818 A    5/2017
EP    1632132 A2 *   3/2006 ........... A01G 23/083
(Continued)

OTHER PUBLICATIONS

Search Report Under Section 17(5); Intellectual Property Office of the United Kingdom; GB1810453.9; dated Nov. 23, 2018; 4 pages.
(Continued)

*Primary Examiner* — Minnah L Seoh
*Assistant Examiner* — Abigail R Hymel
(74) *Attorney, Agent, or Firm* — Taft Stettinius & Hollister LLP

(57) ABSTRACT

A track driven work machine including a body, a first track laying assembly pivotally connected to the body, and a second track laying assembly pivotally connected to the body. The second track laying assembly is spaced apart from the first track laying assembly in a direction transverse to a running direction of the track laying assemblies. In order to navigate uneven grounds, the track driven work machine includes a hydraulic system for synchronizing pivotal movement of the first and second track laying assembly and which is configured to pivot the second track laying assembly in an opposite direction to the first track laying assembly when the first track laying assembly is pivoted in a first direction, and vice versa.

14 Claims, 4 Drawing Sheets

(58) Field of Classification Search
CPC .... B62D 55/104; B62D 55/112; B62D 55/116
See application file for complete search history.

(56) References Cited

U.S. PATENT DOCUMENTS

| | | | |
|---|---|---|---|
| 5,806,616 A | | 9/1998 | Enlund et al. |
| 9,688,322 B1* | | 6/2017 | Prickel ................. B62D 55/084 |
| 10,526,027 B2* | | 1/2020 | Sauvageau ............ F16F 9/3292 |
| 2008/0174097 A1* | | 7/2008 | Kaethner ................ E21B 7/025 |
| | | | 280/782 |
| 2010/0044124 A1 | | 2/2010 | Radke et al. |
| 2013/0277125 A1 | | 10/2013 | Moser |
| 2014/0367181 A1 | | 12/2014 | Van Mill |

FOREIGN PATENT DOCUMENTS

| | | | |
|---|---|---|---|
| JP | 5170147 A | 2/1996 | |
| JP | 3224876 A | 6/1996 | |
| SU | 763176 A1 | 9/1975 | |
| WO | WO-2007139878 A2 * | 12/2007 | ......... B60G 17/0165 |
| WO | 2013000514 A | 1/2013 | |
| WO | 2014182235 A1 | 11/2014 | |
| WO | 2016156660 A1 | 10/2016 | |

OTHER PUBLICATIONS

Examination Report Under Section 18(3); UK Intellectual Property Office; Patent Application No. GB1810453.9; dated Feb. 10, 2022; 2 pages.

Examination Report Under Section 18(3); UK Intellectual Property Office; Patent Application No. GB1810453.9; dated Jul. 21, 2022; 3 pages.

International Search Report; European Patent Office; International Application No. PCT/GB2019/051779; dated Sep. 23, 2019; 4 pages.

Written Opinion of the International Searching Authority; European Patent Office; International Application No. PCT/GB2019/051779; dated Sep. 23, 2019; 6 pages.

\* cited by examiner

TRACK DRIVEN WORK MACHINE

CROSS REFERENCE TO RELATED APPLICATIONS

This application is a U.S. national stage filing of International Patent Application No. PCT/GB2019/051779 filed Jun. 24, 2019, which claims priority to Great Britain Application No. 1810453.9 filed Jun. 26, 2018, the contents of each application hereby incorporated by reference in their entirety.

TECHNICAL FIELD

The present invention relates to a track driven work machine. In particular, the present invention relates to track driven machinery for agriculture and/or landscaping applications, such as wood-chippers, shredders, combined chipper/shredders, or tool carriers.

BACKGROUND

Track driven work machinery is well known and particularly useful in areas where access by conventional trailer-hitched machines would be difficult in view of the lack of access to road vehicles. Track driven work machines are utilised for various different ways such as wood chippers/shredders and tool carriers. Landscaped parks and forestry areas can present problems of access to conventional trailer-hitched machinery. In view of this, the track driven machinery, such as chippers and wood shredders, may be advantageous as the cut wood does not have to be transported from the cutting site. By driving the track driven machine to the cutting site, chipping and/or shredding can be performed on site.

In one known track driven wood-chipper/shredder, the track laying assemblies on either side of the chipper body are slidably mounted on horizontal rails. A hydraulic cylinder is provided which can urge the tracks outwardly relative to the body on the horizontal rails in order to provide additional lateral stability to the chipper/shredder when the chipper is arranged on sloping grounds. The machine is driven on its tracks to the relevant site or upon reaching sloping terrain the tracks can be actuated outwardly by the hydraulic ram so as to provide the necessary, additional stability. This known arrangement has certain drawbacks. In particular, the arrangement of a track laying assembly with the hydraulic cylinders and the horizontal rails beneath the body limits the ground clearance of the chipper/shredder which is disadvantageous when it is desired to traverse rough and uneven ground.

In view of the above, the track driven chipper/shredder of EP 1338495 B1 includes two arms carrying the tracks of the chipper/shredder, the arms being moveably mounted to the body of the chipper/shredder. The arms are arranged at an angle relative to the horizontal plane and are slidable so as to increase its stability and ground clearance at the same time.

Although the chipper/shredder known from EP1338495 B1 provides significantly better ground clearance to traverse rough ground and sufficient breadth between the tracks to provide stability when the machine travels across difficult terrain, this chipper/shredder still encounters difficulties when travelling up particularly steep slopes. In detail, on slopes of more than 40 degrees, the heavy weight of the chipper/shredder's body may cause the machine to overbalance when travelling along/up said slope. Additionally, or alternatively, overbalance of the chipper/shredder may be caused by the tracks running on uneven grounds, e.g. when one of the track laying assemblies encounters an obstacle such as a rock or tree stump along its direction of travel. Such uneven grounds can cause the chipper/shredder to shift its weight to one side, that is, over to one of the two track laying assemblies, thereby causing unbalance, particularly on steep inclines. Similar problems occur when using tool/load carriers in uneven terrain.

SUMMARY OF THE INVENTION

In view of the above, it is an object of the present invention to provide an improved track driven machine, which exhibits increased stability on uneven grounds and the ability to navigate even steeper slopes safely.

According to an aspect of the present invention, there is provided a track driven work machine, comprising a body and a first track laying assembly pivotally connected to the body. A second track laying assembly is pivotally connected to the body, the second track laying assembly being spaced apart from the first track laying assembly in a direction transverse to the running direction of the track laying assembly. The track driven work machine further comprises a means for synchronising pivotal movement of the first and second track laying assembly, wherein said means is configured to pivot the second track laying assembly in an opposite direction to the first track laying assembly, when the first track laying assembly is pivoted in a first direction, and vice versa.

The track driven work machine of this aspect is able to compensate for uneven surfaces by pivotally arranging the first and second track laying assemblies relative to the body structure of the chipper/shredder. In other words, if one of the two track laying assemblies encounters an obstacle, such as a wood stump, said track laying assembly may pivot relative to the body, rather than causing the entire track driven work machine to pivot. As such, the position of the body remains largely the same even if obstacles are encountered by one of the track laying assemblies. In order to avoid an unbalance of the track driven work machine caused by pivotal movement of one of the track laying assemblies, a synchronising means is provided to counteract the pivotal movement of one of the track laying assemblies with the other track laying assembly. When one of the track laying assemblies pivots in one direction, the synchronising means acts to pivot the other track laying assembly in an opposite, second direction to compensate for the pivoting movement of the first track laying assembly.

It will be appreciated that the term track laying assembly may not always refer to a continuous track including a continuous chain as described hereinbelow with respect to the attached drawings; rather it can refer to any ground engaging drive system, such a plurality of wheels arranged in one or more rows.

In the track driven work machine of this aspect, the means for synchronising pivotal movement are constructed as a passive synchronising device. In other words, the means for synchronising pivotal movement does not require any external power input to synchronise the pivotal movement of the tracks in opposite directions. The passive synchronising device may be any mechanical, hydraulic or pneumatic arrangement that causes one of the track laying assemblies to pivot in an opposite direction, in reaction to the other track laying assembly being forced to pivot to compromise for uneven grounds.

In the track driven work machine of this aspect, the means for synchronising is a hydraulic system. The first and second track laying assembly may, therefore, be hydraulically connected, the hydraulic fluid causing pivotal movement of one of the track laying assemblies when the other travels across uneven grounds. The incompressible nature of hydraulic fluids provides for quick and reliable synchronisation of the pivotal movement between the two track laying assemblies. Alternatively, it is also feasible to employ other media, such as compressed air in a pneumatic system, for example.

In the track driven work machine of this aspect, the hydraulic system comprises a first hydraulic cylinder configured to pivot the first track laying assembly with respect to the body and a second hydraulic cylinder configured to pivot the second track laying assembly with respect to the body.

In the track driven work machine of this aspect, the first and second hydraulic cylinders each comprise a first rod side chamber separated from a second chamber by a piston, wherein the first chambers of the first and second hydraulic cylinders are fluidly connected, and wherein the second chambers of the first and second hydraulic cylinders are fluidly connected. The first rod side chambers of the first and second hydraulic cylinders are, therefore, in permanent communication with each other. Likewise, the second chambers of the first and second hydraulic cylinders are permanently connected. In one example, as the track driven work machine moves forward towards its leading end and the front of the left track rises as the latter negotiates an obstacle, this causes the first hydraulic actuator to increase in length. Hydraulic fluid then flows out from the first rod chamber of the first hydraulic cylinder and is pushed into the first rod chamber of the second hydraulic cylinder. This causes the second hydraulic cylinder to decrease in length causing the second track laying assembly to pivot in an opposite direction. In other words, movement of the first track laying assembly due to the encountered obstacle causes the second hydraulic actuator to move in an opposite direction without the need for any active power input.

The means for synchronising may be configured to pivot the first and second trailing assemblies by substantially the same amount. Pivoting the two track laying assemblies by the same degree, in opposite directions, will provide maximum stability. However, it is also feasible to pivot the two track laying assemblies differently in order to avoid overcompensation.

The first and/or second hydraulic cylinders may be arranged on top of their respective track laying assembly. In a specific example, this may mean that the hydraulic cylinder is arranged between the track laying assemblies and the body of the track driven work machine. In this embodiment, the hydraulic cylinders are advantageously distanced from the ground surface and protected from environmental influences, such as soil and debri by the track laying assembly itself. In this regard, "on top" does not necessarily mean that the hydraulic cylinders are arranged above a continuous chain of track laying assembly but are generally arranged above a longitudinal axis of the track laying assemblies.

According to another embodiment, the first hydraulic cylinder has a first end pivotally connected to the body and a second end pivotally connected to the first track laying assembly, wherein the second hydraulic cylinder has a first end pivotally connected to the body and a second end pivotally connected to the second track laying assembly. Accordingly, the first hydraulic cylinder may be used to pivot the first track laying assembly relative to the body of the track driven work machine. Similarly, the second hydraulic cylinder may be used to pivot the second track laying assembly relative to the body. To this end, the first and second track laying assemblies may be connected to the body via a support structure. The support structure itself may be connected to the body of the track driven work machine such that the pivoting forces can be transferred to the body.

The first and second track laying assemblies may comprise a leading end, facing a designated front end of the body, and an opposite trailing end, the second ends of the first and second hydraulic cylinders being arranged closer to the trailing end of their respective track laying assembly. In other words, the first and second hydraulic cylinders may be connected with a track laying assembly at a position that is closer to the back end of the track driven work machine. This will further protect the hydraulic cylinders from soil, which may be thrown up by the track laying assembly when the track driven work machine navigates loose terrain.

The piston of the first and second hydraulic cylinders may comprise identical surface areas. Accordingly, a certain amount of hydraulic fluid displaced in the first hydraulic cylinder will cause the rod of the second hydraulic cylinder to move by the same length, in an opposite direction. The first and second hydraulic cylinders of this embodiment act as a stand-alone closed hydraulic circuit.

The hydraulic system may comprise a pressurised fluid source connected to connectable to the first or second chambers of the first and second hydraulic cylinders. The pressure source may be any source capable of providing pressurised hydraulic fluid, such as a hydraulic pump or an accumulator, for example. The pressurised source may be connectable to one or more of the chambers of the first and/or second hydraulic cylinders upon the operator's request. As such, the first and second hydraulic cylinders may not only extend and retract as a result of pivoting movement caused by uneven grounds. Rather, it may also be possible to actively pivot the track laying assemblies relative to the body of the track driven work machine. This arrangement allows for an active control mode of the present track driven work machine. In other words, the operator has control of a control valve which allows hydraulic fluid to flow to and from both hydraulic actuators.

For example, the pressurised fluid source may be connected to both first rod chambers of the hydraulic cylinders simultaneously, thereby causing both track laying assemblies to pivot in the same direction at the same time. This has the effect of tilting the track laying assemblies relative to the body of the track driven work machine and can be performed in both directions. As such, the track driven work machine of the present invention is able to more easily negotiate rising or falling terrain while keeping the body of the machine level. It should be noted that the active control and the passive compensation movements described hereinbefore can be used simultaneously. In simple terms, if the track laying assemblies have already been actively pivoted to enable the machine to negotiate rising or falling terrain, it is still possible for both tracks to pivot even further to compensate for obstacles along the slope.

In yet another embodiment, each track assembly is carried by a respective arm, the arms being movably mounted to the body. Arm actuators may be provided for each arm, the arm actuators being configured to move the respective arm so as to move the corresponding track laying assemblies relative to the body such that ground clearance of the body and distance between the track laying assemblies are adjustable. According to this embodiment, the track laying assemblies may not only be able to pivot relative to the body but also adjustable in a vertical and horizontal direction with respect to the latter. This provides the track driven work machine of the present invention with even more stability on angled surfaces.

Each of the arms may be telescopically extendable and retractable along their respective longitudinal axis. Each of said arms may further comprise hydraulic fluid lines connecting the first and second hydraulic cylinders to a pressurised fluid source. The arms may therefore be used to both mechanically and hydraulically connect the track laying assemblies to the body of the track driven work machine. As such, it is easily possible to provide hydraulic fluid pressurized by the engine of the track driven work machine to actively control the track laying assembly's pivotal movement.

In one embodiment, the track driven machine is a wood-chipper/shredder for brush-wood or combined wood-chipper and shredder for brush-wood. Alternatively, the track driven machine may be a tool/load carrier, which is a universal track driven machine with many attachments available to do a wide variety of different, mostly agricultural jobs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination unless such features are incompatible. The applicant reserves the right to change any originally filed claim or file any new claim accordingly, accordingly, the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
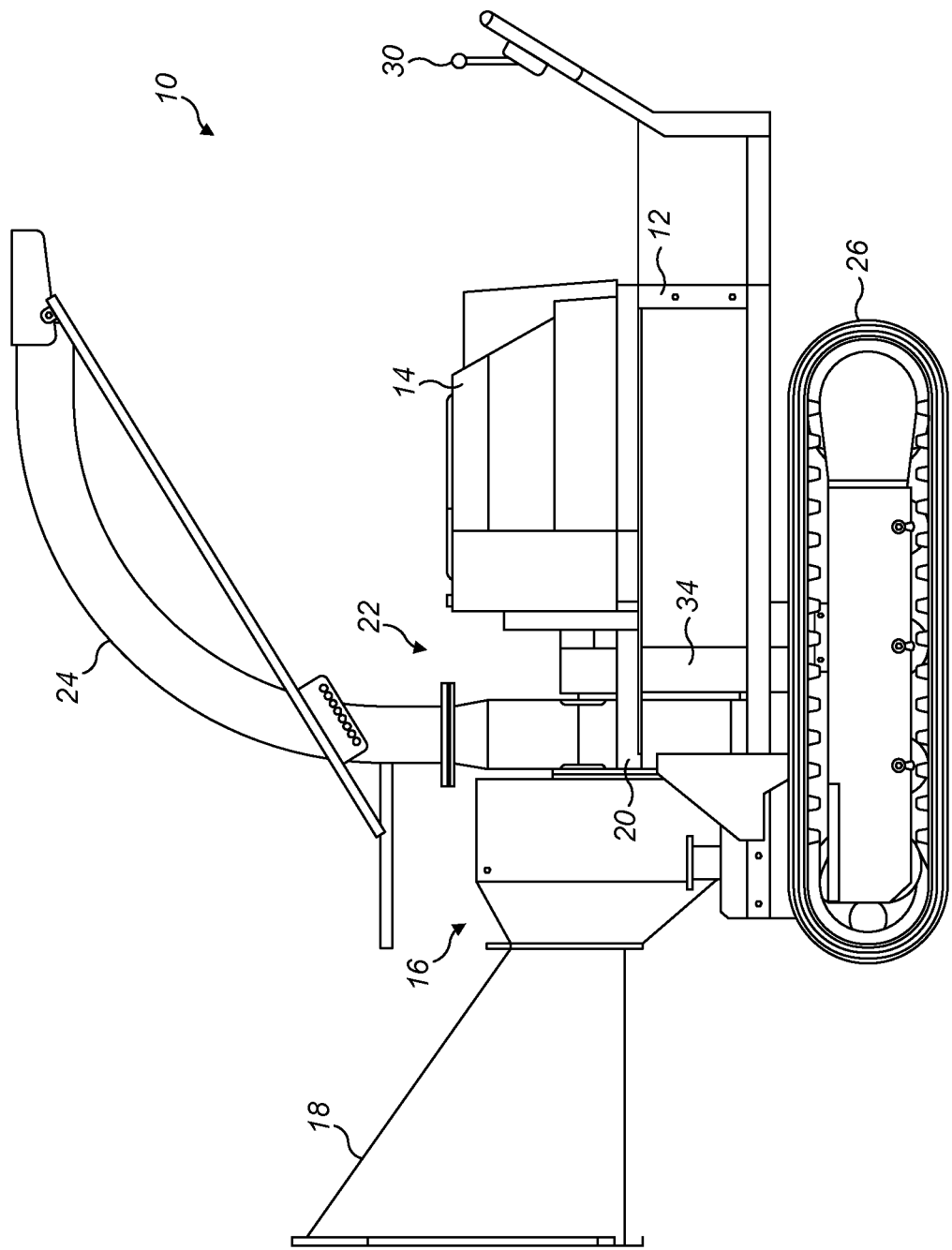
FIG. 1 is a side view of a track driven machine in accordance with the present invention.

In FIG. 1, a track driven machine, particularly a chipper/shredder is generally indicated at 10. The chipper 10 comprises a body 12, which carries an internal combustion engine (not shown) covered by an engine cover 14. The internal combustion engine drives a hydraulic motor, which, in turn propels in-feed rollers (not shown) of a chipper arrangement 16. The chipper arrangement 16 is known and briefly comprises an in-feed chute 18 and feeder rollers for feeding in logs or other wood material to be chipped. A fly-wheel (not shown) mounted on a drive shaft 20 is arranged to be driven by the aforesaid internal combustion engine. The fly-wheel has chipping blades mounted thereupon and is arranged to rotate at high speeds in order to effect chipping of wood inserted through the in-feed chute 18. An exhaust mechanism 22 comprises means for generating an air flow which forces chipped material up via a chimney 24 and out of the chipper/shredder 10. The chimney 24 is normally directed towards a storage container (not shown). In some instances, the chipped material may instead be left at the site.

The chipper/shredder 10 is mounted on two track laying assemblies 26, 28 shown in FIG. 1. Each track laying assembly 26, 28 is driven by means of a hydraulic motor. A valve arrangement is provided to switch hydraulic power between the track laying assemblies 26, 28 and the hydraulic motors driving the feeder rollers. In addition, a pair of hydraulic actuator levers is provided, one for each track laying assembly 26, 28 so that the chipper/shredder can be driven and manoeuvred by controlling the tracks 26, 28. The hydraulic levers are shown at 30.

Figure 2:
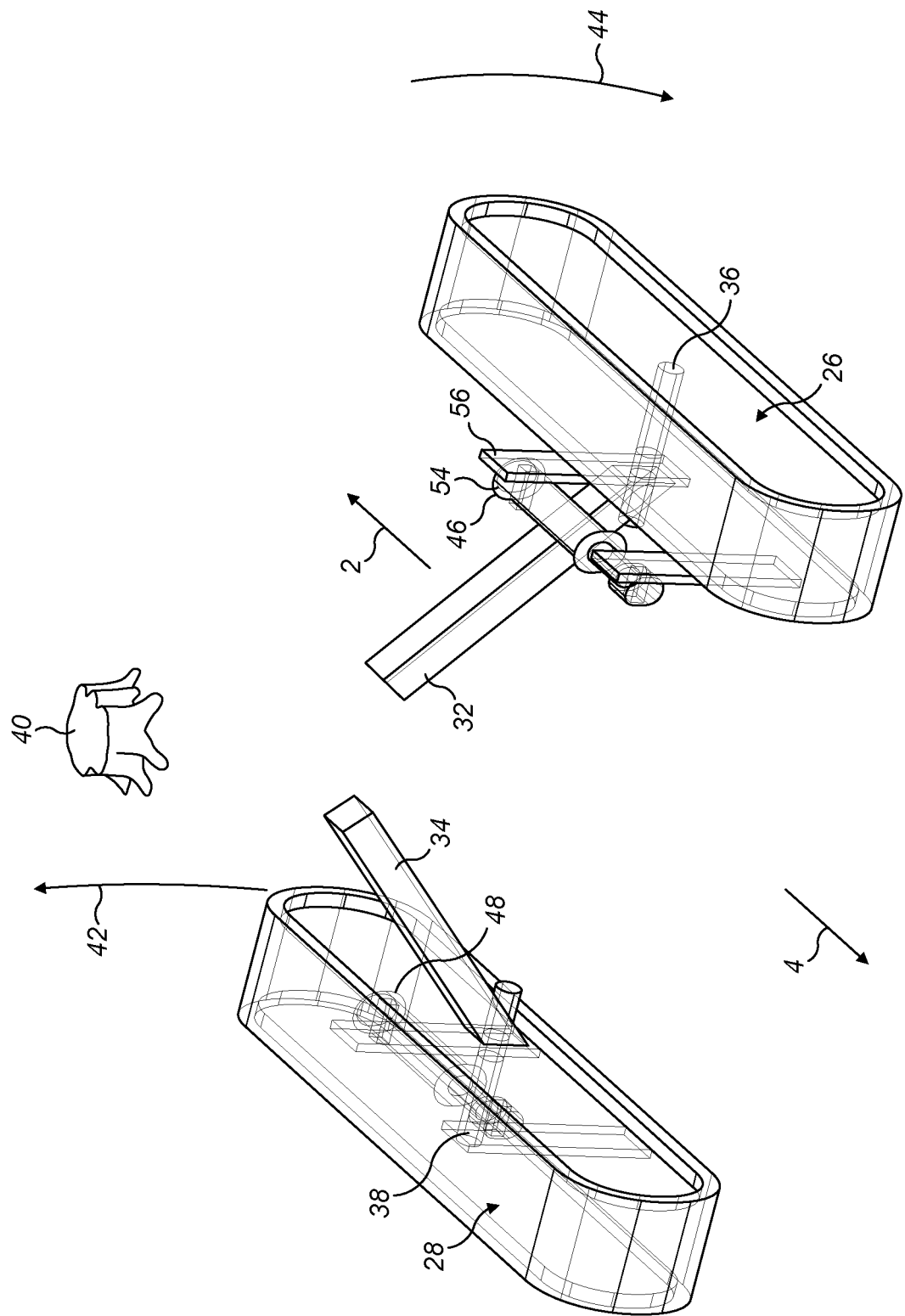
FIG. 2 is a perspective view of two track laying assemblies including first and second hydraulic cylinders.

The track laying assemblies 26, 28 are carried by corresponding, telescopically extendable arms 32, 34, as can be derived from FIG. 2 for example. With further reference to FIG. 2, it will be appreciated that the first track laying assembly 26 is pivotally connected to a first mounting arm 32. To this end, a pivoting pin 36 extends laterally into the first track laying assembly 26. The first pivoting pin 36 is arranged substantially in the centre of the first track laying assembly 26 and allows the first track laying assembly 26 to pivot relative to the body 12 of the chipper/shredder 10. The second track laying assembly 28 is pivotally connected to the second mounting arm 34. To this end, a second pivoting pin 38 is received in the second track laying assembly 28 and connects the latter to the mounting arm 34. The second pivoting pin 38 enables the second track laying assembly 28 to pivot relative to the body 12 of the chipper/shredder 10. The chipper/shredder 10 has a leading end 2 and a trailing end 4. In normal operation the chipper will move forward, i.e. towards the leading end 2.

If the chipper/shredder 10 moves forwards towards the leading end 2 and encounters an obstacle, like tree stump 40. The track laying assembly hitting the obstacle, in this case the second track laying assembly 28, will pivot about pin 38 such that a front end of the second trailing assembly moves upwards as shown by arrow 42 in FIG. 2. As will be explained in more detail below, the means for synchronising pivotal movement of the first and second track laying assemblies 26, 28 will then cause the first track laying assembly 26 to pivot about pin 36 in an opposite direction, i.e. the front end of the first track laying assembly 26 will pivot downwards in the direction of arrow 44.

Figure 3:
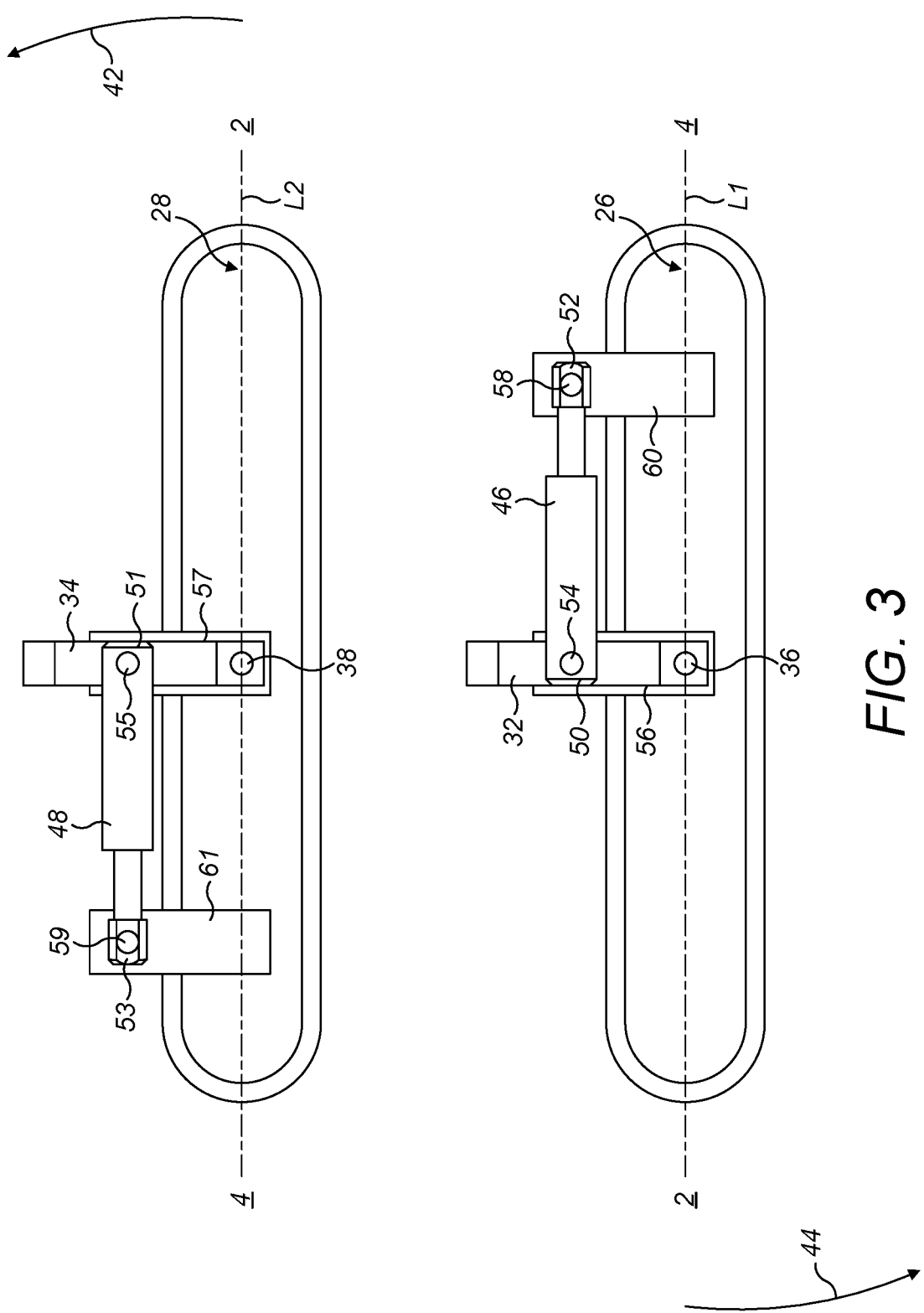
FIG. 3 shows side views of both track laying assemblies shown in FIG. 2.
Figure 4:
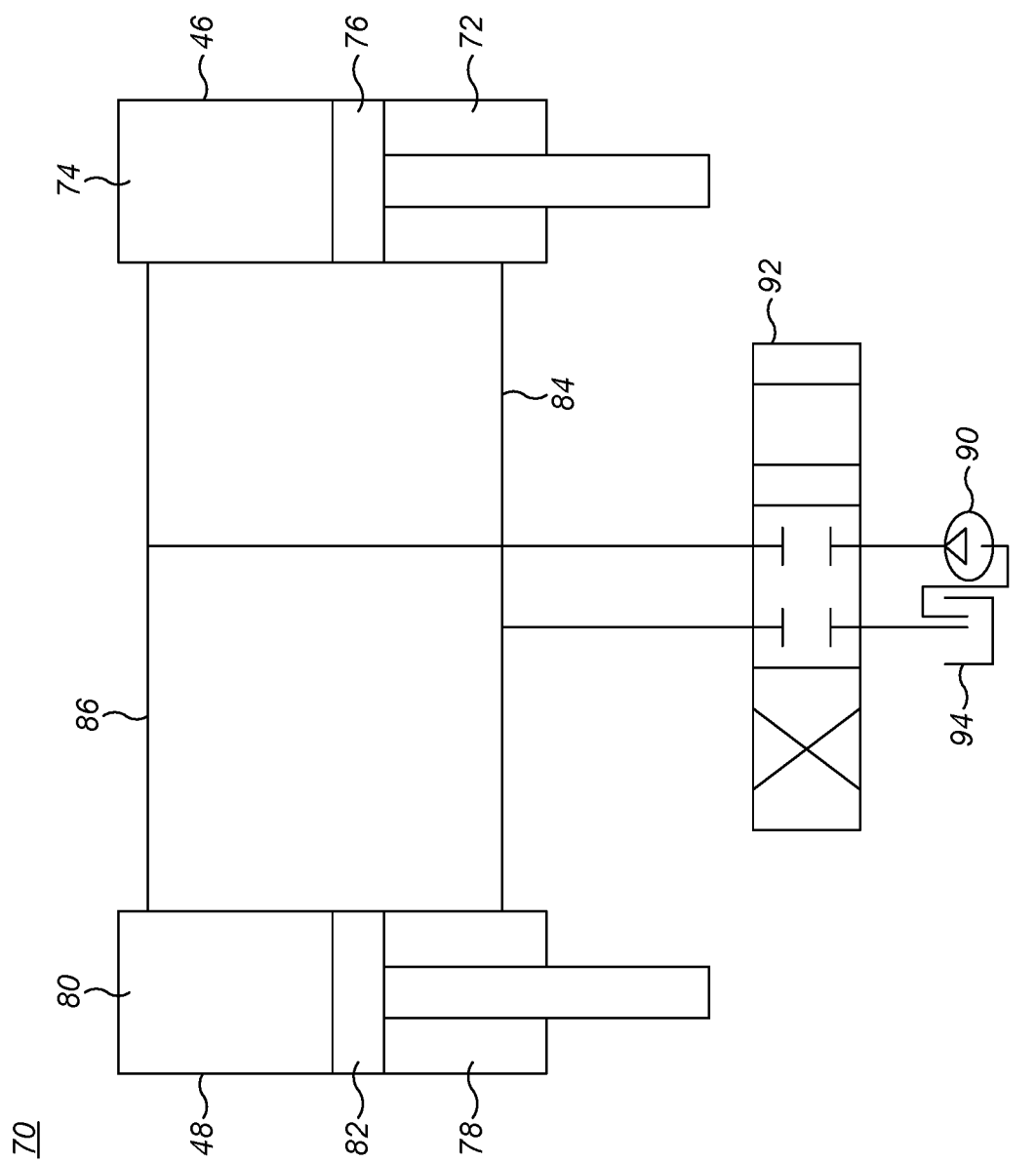
FIG. 4 shows one example of the synchronisation means provided in the present invention.

In the embodiment of FIGS. 2 to 4, the means for synchronising pivotal movement of the first and second track laying assembly 26, 28 is a hydraulic system. Two components of the hydraulic system, a first and a second hydraulic cylinder 46, 48 are shown in FIG. 2. The first hydraulic cylinder 46 is connected to the first track laying assembly 26 and the second hydraulic cylinder 48 is connected to the second track laying assembly 28. The function of the first and second hydraulic cylinders will be described in more detail with reference to FIGS. 3 and 4.

FIG. 3 shows side views of the first and second track laying assemblies 26, 28 and their corresponding first and second hydraulic cylinders 46, 48. The first hydraulic cylinder 46 has a first end 50 pivotally connected to the body 12 and an opposite, second end 52 pivotally connected to the first track laying assembly 26. The first end 50 of the first hydraulic cylinder 46 is connected to the body 12 via first pivoting pin 54. The first pivoting pin 54 is fixed to a first mounting bracket 56 and the first end 50 of the first hydraulic cylinder 46 is freely pivotal about first pin 54. The first mounting bracket 56 is rigidly connected to the body 12 of the chipper 10 via first arm 32 as is more readily derivable from FIG. 2.

The second end 52 of the first hydraulic cylinder 46 is pivotally connected to the first track laying assembly 26 via a second pivoting pin 58. The second pivoting pin is attached to a second mounting bracket 60 and the second end 52 of the first hydraulic cylinder is freely pivotable about the second pivoting pin 58. The second mounting bracket 60, in turn, is rigidly connected to the first track laying assembly 26.

The first and second mounting brackets 56 and 60 are arranged such that the pivoting pins 54 and 58 and, therefore, the first hydraulic cylinder 46 can be arranged on top of the first track laying assembly 26, that is, above a longitudinal axis L1 of the first track laying assembly 26. Arranging the first hydraulic cylinder and its corresponding pivoting pins 54 and 58 in this way, reduces the amount of dirt and debris the first hydraulic cylinder is subjected to.

As mentioned hereinbefore, the second end 52 (in this embodiment the rod end) of the first hydraulic cylinder 46 is arranged closer to the trailing end 4 of the chipper. This is because the leading end 2 of the first track laying assembly 26 can throw up debris, particularly when travelling on loose soil. In order to avoid unnecessary contact of debris with the first hydraulic cylinder 46, the latter is arranged closer to the trailing end 4 of the first track laying assembly 26.

The second hydraulic cylinder 48 has a first end 51 pivotally connected to the body 12 and an opposite, second end 53 pivotally connected to the second track laying assembly 28. The first end 51 of the second hydraulic cylinder 48 is connected to the body 12 via first pivoting pin 55. The first pivoting pin 55 is fixed to a first mounting bracket 57 and the first end 51 of the second hydraulic cylinder 48 is freely pivotal about first pivoting pin 55. The first mounting bracket 57 is rigidly connected to the body 12 of the chipper 10 via second arm 34 as shown in FIG. 2.

The second end 53 of the second hydraulic cylinder 48 is pivotally connected to the second track laying assembly 28 via a second pivoting pin 59. The second pivoting pin is attached to a second mounting bracket 61 and the second end 53 of the second hydraulic cylinder 48 is freely pivotable about the second pivoting pin 59. The second mounting bracket 61 is rigidly connected to the second track laying assembly 28.

The first and second mounting brackets 57 and 61 are arranged such that the pivoting pins 55 and 59 and, therefore, the first hydraulic cylinder 48 can be arranged on top of the second track laying assembly 28, that is, above a longitudinal axis L2 of the first track laying assembly 26. Arranging the first hydraulic cylinder and its corresponding pivoting pins 55 and 59 in this way reduces the amount of dirt and debris the second hydraulic cylinder 48 is subjected to.

As mentioned hereinbefore, the second end 53 (in this embodiment the rod end) of the second hydraulic cylinder 48 is arranged closer to the trailing end 4 of the chipper. This is because the leading end 2 of the second track laying assembly 28 can throw up debris, particularly when travelling on loose soil. In order to avoid unnecessary contact of debris with the second hydraulic cylinder 48, the latter is arranged closer to the trailing end 4 of the second track laying assembly 28.

One embodiment of the means for synchronising pivotal movement of the first and second track laying assemblies 26, 28 is shown in FIG. 4. FIG. 4 shows a schematic of a hydraulic system 70 used as the means for synchronising pivotal movement. The hydraulic system 70 comprises the first and second hydraulic cylinders 46, 48 described hereinbefore.

The first hydraulic cylinder 46 comprises a first rod-side chamber 72 separated from a second chamber 74 by a piston 76. The second hydraulic cylinder 48 comprises a first rod-side chamber 78 separated from a second chamber 80 by a piston 82. The first rod-side chamber 72 of the first hydraulic cylinder 46 is directly connected to the first rod-side chamber 78 of the second hydraulic cylinder 48, via conduit 84. The second chamber 74 of the first hydraulic cylinder is directly connected to the second chamber 80 of the second hydraulic cylinder 48 via conduit 86.

In the embodiment of FIG. 4, the first rod-side chambers 74 and 78 of the first and second hydraulic cylinders 46, 48 are permanently connected via the conduit 84. Similarly, the second chambers 74 and 80 of the first and second hydraulic cylinders 46, 48 are permanently connected via conduit 86.

Imagine the scenario pictured in FIG. 2, in which the second track laying assembly 28 encounters an obstacle, such as tree stump 40, when travelling in direction 2. As described hereinbefore, the second track laying assembly 28 will pivot about the pin 38 in the direction 42, that is, the front end of the second track laying assembly 28 will move upwards. This movement causes the second hydraulic actuator 48 to extend, because pivotal movement of the second track laying assembly in the direction 42 will cause a corresponding pivotal movement of the second mounting bracket 61 together with the second track laying assembly 28. This, in turn, moves the second mounting bracket 61 further away from the first mounting bracket 57, thereby extending the second hydraulic actuator 48. In other words, pivoting movement of the first track laying assembly 28 will cause the distance between the first and second pivoting pins 55 and 59 to increase, thereby pulling the rod further out of its cylinder and thus extending the second hydraulic actuator 48.

Turning back to FIG. 4, extension of the second hydraulic cylinder 48 will cause piston 82 to move towards the rod-side chamber 78, thereby reducing the first rod-side chamber's volume and pushing hydraulic fluid out of said chamber 78. Fluid pushed out of chamber 78 is transferred into rod-side chamber 72 of the first hydraulic actuator 46 via conduit 84. Consequently, piston 76 of the first hydraulic cylinder will be pushed towards the second chamber 74 of the first hydraulic cylinder 46, thereby compressing hydraulic cylinder 46. As cylinder 46 compresses, piston 76 moves towards the second chamber 74 and pushes hydraulic fluid out of second chamber 74 towards second chamber 80 of the second hydraulic cylinder 48 via conduit 86. The two hydraulic cylinders 46 and 48 together with the conduits 84 and 86, therefore, act as a closed hydraulic circuit for this mode of operation.

As the first hydraulic cylinder 46 is compressed, the corresponding rod of the first hydraulic cylinder 46 will pull the second mounting bracket 60, thereby causing pivotal movement of the first track laying assembly 26 in direction 44 shown in FIGS. 2 and 3. As has been described hereinbefore, direction 44 is opposite to the pivotal movement direction 42 of the second track laying assembly. In other words, as the second track laying assembly 28 pivots in a first direction, the shared hydraulic fluid between the first and second hydraulic cylinders 46 and 48 causes actuation of a pivotal movement of the first track laying assembly 26 in the opposite direction 44.

In view of the above mode of operation, the means for synchronising is a passive synchronising device, that is, no external power supply is necessary to synchronise movement of the two track laying assemblies 26 and 28. Rather, energy created by forced pivotal movement of one of the actuators due to the uneven ground conditions may be used to pivot the other actuator in an opposite direction. Of course, it should be appreciated that it is equivalently possible to actuate the second hydraulic cylinder 48 in response to pivotal movement of the first track laying assembly 26. The synchronising device works both ways.

In an alternative mode of operation, the hydraulic system 70 shown in FIG. 4 can also be used to actively pivot one or both of the hydraulic cylinders 46 and 48. To this end, a pressurised fluid source 90 may be provided, which is connectable to one or both of the first rod-side chambers 72, 78 or second chambers 74, 80 respectively.

In the embodiment of FIG. 4, the pressurised fluid source 90 may either be connected to both rod-side chambers 72, 78 or, alternatively, to both second chambers 74, 80 of the first and second hydraulic cylinders 46, 48. In order to control connection of the pressurised fluid source 90 with the first, rod-side chambers 72, 78 or the second chambers 74, 80 respectively, a control valve 92 is provided between the pressurised fluid source 90 and conduits 84 and 86.

In the configuration shown in FIG. 4, the pressurised fluid source 90 is disconnected from the hydraulic cylinders 46 and 48 and thus no active control of the pivoting movement is possible. Rather, the hydraulic system 70 only acts as the aforementioned passive system in this scenario. If the operator chooses to pivot both track laying assemblies 26 and 28 upwards at their front end in direction 42, the controller may switch control valve 92 to the state illustrated on the right in FIG. 4, in which the pressurised fluid source is connected to conduit 86 and therefore to second chambers 74 to 80. At the same time, the first rod-side chambers 72 and 78 are then connected to a fluid reservoir 94.

As pressurised fluid is provided in the second chambers 74 and 80 of the first and second hydraulic cylinders, the latter will extend simultaneously, thereby increasing the distance between their respective front and back ends. As will be appreciated, extending the first and second hydraulic cylinders 46, 48 causes the front ends of the first and second track laying assemblies 26, 28 to rise, i.e. pivot in direction 42. This will enable tilt control of the chipper 10 relative to the tracks thus enabling the tracks on the machine to negotiate rising or falling terrain while keeping the body 12 of the chipper 10 level.

Of course, this operation is reversible, by switching the control valve 92 into the state depicted on the left in FIG. 4, thereby connecting the pressurised fluid source 90 with the first, rod-side chambers 72 and 78 of the first and second hydraulic cylinders 46, 48. In this scenario, the hydraulic cylinders 46 and 48 are compressed, resulting in a pivotal movement of the two track laying assemblies in the opposite direction 44.

In both scenarios (active extension and compression of the hydraulic cylinders 46 and 48) the excess fluid in the non-pressurised chamber is pushed towards a fluid reservoir 94 via control valve 92. Control valve 92, in this example, is illustrated as a 4/3 way valve. However, it will be appreciated that any other suitable valve arrangement may be used to control supply of pressurised fluid to the system. While control valve 92 is depicted as an on/off valve, it is also feasible to employ proportional valves to more accurately control the flow of fluid provided by the pressurised fluid source 90. Finally, further control valves may be implemented to actively control actuation of the first and second hydraulic cylinders 46 and 48 individually.

In another alternative, it may be possible to replace the hydraulic system 70 with a pneumatic system that includes pneumatic cylinders and a pressurised gas source.

Although the detailed description referred to a wood chipper/shredder as a specific example of the track driven machine according to the present invention, it should be appreciated that the track driven machine may also be a tool carrier or any other track driven, agricultural device.

The invention claimed is:

1. A track driven work machine, comprising:
a body;
a first track laying assembly pivotally connected to the body;
a second track laying assembly pivotally connected to the body, the second track laying assembly being spaced apart from the first track laying assembly in a direction transverse to a running direction of the track laying assemblies, and
a hydraulic system for synchronizing pivotal movement of the first and second track laying assembly, comprising:
a first hydraulic cylinder configured to pivot the first track laying assembly with respect to the body and a second hydraulic cylinder configured to pivot the second track laying assembly with respect to the body, wherein the first and second hydraulic cylinders each comprise a first rod side chamber separated from a second chamber by a piston, and wherein the first chambers of the first and second hydraulic cylinders are fluidly connected, and wherein the second chambers of the first and second hydraulic cylinders are fluidly connected,
wherein said hydraulic system is configured to pivot the second track laying assembly in an opposite direction to the first track laying assembly, when the first track laying assembly is pivoted in a first direction, and vice versa, and
wherein each track laying assembly has a mounting member spaced from the pivotal connection of the track laying assembly to the body, each mounting member having a first end attached to the track laying assembly and a free end projecting above the level of the track laying assembly, the free end of each mounting member mounting one end of the respective hydraulic cylinder, the other end of each cylinder being mounted to the body above the track laying assembly, such that each cylinder is arranged above the level of the respective track laying assembly.

2. The track driven work machine of claim 1, wherein the hydraulic system is configured to pivot the first and second track laying assemblies by substantially the same amount.

3. The track driven work machine of claim 1, wherein the first and/or the second hydraulic cylinder is/are arranged on top of the first track laying assembly and the second track laying assembly, respectively.

4. The track driven work machine of claim 1, wherein the first hydraulic cylinder has a first end pivotally connected to the body and a second end pivotally connected to the first track laying assembly, and wherein the second hydraulic cylinder has a first end pivotally connected to the body and a second end pivotally connected to the second track laying assembly.

5. The track driven work machine of claim 4, wherein each of the first and second track laying assemblies comprise a leading end, facing a designated front end of the body, and an opposite trailing end, the second ends of the first and second hydraulic cylinders being arranged closer to the trailing end of a respective one of the first track laying assembly and the second track laying assembly.

6. The track driven work machine of claim 1, wherein a piston of the first hydraulic cylinder and a piston of the second hydraulic cylinder comprise identical surface areas.

7. The track driven work machine of claim 1, wherein the hydraulic system comprises a pressurized fluid source connected or connectable to first and second chambers of the first and second hydraulic cylinders.

8. The track driven work machine of claim 1, wherein each of the first and second track assemblies is carried by a respective arm movably mounted to the body.

9. The track driven work machine of claim 8, wherein arm actuators are provided for each of the arms, the arm actuators being configured to move the respective arms so as to move the corresponding track laying assembly relative to the body such that a ground clearance of the body and a distance between the track laying assemblies are adjustable.

10. The track driven work machine of claim 8, wherein each of the arms is telescopically extendable and retractable along their respective longitudinal axis.

11. The track driven work machine of claim 8, wherein each of said arms comprises hydraulic fluid lines connecting the first and second hydraulic cylinders to a pressurized fluid source of the hydraulic system.

12. The track driven work machine of claim 1, wherein the work machine is a wood-shredder for brushwood or a combined wood-chipper and shredder for brushwood.

13. The track driven work machine of claim 1, wherein the work machine is a tool carrier.

14. The track driven work machine of claim 1, wherein the hydraulic system is constructed as a passive synchronizing device.

* * * * *